United States Patent [19]

Burk, Jr. et al.

[11] Patent Number: 4,883,783

[45] Date of Patent: Nov. 28, 1989

[54] COMPOSITION OF MATTER FOR CONVERSION OF HYDROCARBONS

[75] Inventors: Emmett H. Burk, Jr., Mountain Home, Ark.; Jin S. Yoo, Flossmoor; Cecelia A. Radlowski, Riverside, both of Ill.

[73] Assignee: UOP, Des Plaines, Ill.

[21] Appl. No.: 140,126

[22] Filed: Dec. 31, 1987

Related U.S. Application Data

[60] Division of Ser. No. 48,623, May 11, 1987, Pat. No. 4,735,705, which is a continuation of Ser. No. 615,184, May 30, 1984, abandoned.

[51] Int. Cl.$^4$ .................. B01J 21/02; B01J 21/10; B01J 23/10; B01J 23/58
[52] U.S. Cl. .................. 502/304; 502/302; 502/328; 502/341; 502/524
[58] Field of Search ............... 502/302, 304, 328, 341, 502/524

[56] References Cited

U.S. PATENT DOCUMENTS

| Re. 27,639 | 5/1973 | Burk et al. | 260/672 |
|---|---|---|---|
| 2,992,191 | 7/1961 | Erickson | 252/464 |
| 3,140,253 | 7/1964 | Plank et al. | 208/120 |
| 3,791,992 | 2/1974 | Feldwick | 252/463 |
| 4,428,827 | 1/1984 | Hobbs et al. | 208/113 X |

FOREIGN PATENT DOCUMENTS 0045170 3/1982 European Pat. Off. ............ 208/113

OTHER PUBLICATIONS

"Modern Aspects of Inorganic Chemistry", by H. I. Emateus & A. G. Sharpe (1973) pp. 57-58 & 512-513.
"Structural Inorganic Chemistry", 3rd Edition (1962) by A. F. Wells, pp. 130, 487-490, 503 & 526.
"Advanced Inorganic Chemistry", 3rd Edition, by F. A. Cotton & G. Wilkinson (1972), pp. 54-55.

Primary Examiner—W. J. Shine
Attorney, Agent, or Firm—Vincent J. Vasta, Jr.

[57] ABSTRACT

An improved process for converting hydrocarbons using a catalyst which is periodically regenerated to remove carbonaceous deposits, the catalyst being comprised of a mixture containing, as a major component, solid particles capable of promoting hydrocarbon conversion at hydrocarbon conversion conditions, and, as a minor component, discrete entities comprising at least one spinel, preferably alkaline earth metal-containing spinel, and a minor amount of at least one added component selected from the group consisting of alkali metal components, calcium components, barium components, strontium components, beryllium components and mixtures thereof.

12 Claims, No Drawings

COMPOSITION OF MATTER FOR CONVERSION OF HYDROCARBONS

This application is a division of prior U.S. application Ser. No. 048,623 Filed May 11, 1987, now U.S. Pat. No. 4,735,705 and/which is a continuation of application Ser. No. 615,184 Filed May 30, 1984, now abandoned.

BACKGROUND OF THE INVENTION

The present invention is related to the combusting of solid, sulfur-containing material in a manner to effect a reduction in the emission of sulfur oxides to the atmosphere. In one specific embodiment, the invention involves the catalytic cracking of sulfur-containing hydrocarbon feedstocks in a manner to effect a reduction in the amount of sulfur oxides emitted from the regeneration zone of a hydrocarbon catalytic cracking unit.

Typically, catalytic cracking of hydrocarbons takes place in a reaction zone at hydrocarbon cracking conditions to produce at least one hydrocarbon product and to cause carbonaceous material (coke) to be deposited on the catalyst. Additionally, some sulfur, originally present in the feed hydrocarbons, may also be deposited, e.g., as a component of the coke, on the catalyst. It has been reported that approximately 50% of the feed sulfur is converted to $H_2S$ in the fluid bed catalytic cracking (FCC) reactor, 40% remains in the liquid products and about 4 to 10% is deposited on the catalyst. These amounts vary with the type of feed, rate of hydrocarbon recycle, steam stripping rate, the type of catalyst, reactor temperature, etc.

Sulfur-containing coke deposits tend to deactivate cracking catalyst. Cracking catalyst is advantageously continuously regenerated, by combustion with oxygen-containing gas in a regeneration zone, to low coke levels, typically below about 0.4% by weight, to perform satisfactorily when it is recycled to the reactor. In the regeneration zone, at least a portion of sulfur, along with carbon and hydrogen, which is deposited on the catalyst is oxidized and leaves in the form of sulfur oxides ($SO_2$ and $SO_3$, hereinafter referred to as "SOx") along with substantial amounts of CO, $CO_2$ and $H_2O$.

Considerable amount of study and research effort has been directed to reducing oxide of sulfur emissions from various gaseous streams, including those from the stacks of the regenerators of FCC units. However, in many instances, the results of this work have left much to be desired. Many metallic compounds have been proposed as materials to pick up oxides of sulfur in FCC units (and other desulfurization applications) and a variety of supports, including particles of cracking catalysts and "inerts", have been suggested as carriers for active metallic reactants. Many of the proposed metallic reactants lose effectiveness when subjected to repeated cycling. Thus when Group II metal oxides are impregnated on FCC catalysts or various supports, the activity of the Group II metals is rapidly reduced under the influence of the cyclic conditions. Discrete alumina particles, when combined with silica-containing catalyst particles and subjected to steam at elevated temperatures, e.g., those present in FCC unit regenerators, are of limited effectiveness in reducing SOx emissions. Incorporation of sufficient chromium on an alumina support to improve SOx sorption results in undesirably increased coke and gas production. European Patent Publication No. 0045170 discloses the use of discrete entities comprising magnesium-aluminum-containing spinels to reduce SOx emissions, e.g., from catalytic cracking units.

Accordingly, an object of the present invention is the provision of an improved composition and process for reducing emissions of sulfur oxide.

An additional object of the present invention is to provide an improved composition and process for reducing the emissions of sulfur oxide from the regeneration zones of hydrocarbon catalytic cracking units.

Another object of the invention is to provide an improved hydrocarbon conversion catalyst. These and other objects of the invention will become apparent from the following description and examples.

In one general aspect, the present invention involves a process for combusting solid, sulfur-containing material by contacting the material with gaseous oxygen in a combustion zone at combustion conditions to produce combustion products including sulfur oxide at least a portion of which is sulfur trioxide. The present improvement comprises carrying out this contacting in the presence of discrete entities containing an effective amount, preferably a major amount by weight, of at least one magnesium-aluminum-containing spinel, and a minor, effective amount of at least one added component selected from the group consisting of alkali metal components, calcium components, barium components, strontium components, beryllium components and mixtures thereof, said discrete entities being present in an amount sufficient to reduce the amount of sulfur oxide (relative to combustion in the essential absence of the discrete entities) leaving the combustion zone, e.g, the flue gas emitted from the combustion zone. In a preferred embodiment, the present discrete entities further contain a minor amount of at least one rare earth metal component associated with the spinel to thereby reduce the amount of sulfur oxide (relative to combustion in the essential absence of the discrete entities) emitted from the combustion zone.

In accordance with another aspect, the present invention involves a conversion process which is carried out, preferably in the substantial absence of added free hydrogen, in at least one chemical reaction zone in which sulfur-containing hydrocarbon feedstock is contacted with particulate material to form at least one product, preferably a hydrocarbon product, and sulfur-containing carbonaceous material deposited on the particulate material and at least one regeneration zone in which at least a portion of the sulfur-containing carbonaceous material deposited on the particulate material is contacted with gaseous oxygen to combust at least a portion of the sulfur-containing carbonaceous material and to produce combustion products including sulfur oxide at least a portion of which is sulfur trioxide. The present improvement comprises using a particulate material comprising (A) a major amount of solid particulates capable of promoting the desired hydrocarbon chemical conversion at hydrocarbon conversion conditions and (B) a minor amount of discrete entities comprising an effective amount, preferably a major amount of weight, i.e., at least about 50% by weight, of at least one magnesium-aluminum-containing spinel, and a minor amount of at least one added component selected from the group consisting of alkali metal components, calcium components, barium components, strontium components, beryllium components and mixtures thereof, the discrete entities being present in an amount sufficient to reduce the amount of sulfur oxide in the flue gas from the regeneration zone. It is more preferred that such discrete entities further comprise a minor amount of at least one rare earth metal, preferably, cerium, component associated with the spinel.

In one preferred embodiment, the discrete entities also include a minor, catalytically effective amount of at least one crystalline aluminosilicate effective to promote hydrocarbon conversion, e.g., cracking, at hydrocarbon conversion conditions. The discrete entities are present in an amount sufficient to reduce the amount of sulfur oxides in the regeneration zone effluent when used in a reaction zone-regeneration zone system as described herein.

In one preferred embodiment, the particulate material, more preferably the discrete entities, further comprise a minor amount of at least one additional metal, e.g., a Group VIII platinum group metal, component capable of promoting the oxidation of sulfur dioxide to sulfur trioxide at the conditions in the regeneration zone.

The preferred platinum group metals are palladium and platinum, more preferably platinum.

The preferred relative amounts of the solid particles and discrete entities are about 80 to about 99 parts and 1 to about 20 parts by weight, respectively. This catalyst system is especially effective for the catalytic cracking of a hydrocarbon feedstock to lighter, lower boiling products. The present catalyst system preferably also has improved carbon monoxide oxidation catalytic activity stability.

The improvement of this invention can be used to advantage with the catalyst being disposed in any conventional reactor-regenerator system, e.g., in ebullating catalyst bed systems, in systems which involve continuously conveying or circulating catalyst between reaction zone and regeneration zone and the like. Circulating catalyst systems are preferred. Typical of the circulating catalyst bed systems are the conventional moving bed and fluidized bed reactor-regenerator systems. Both of these circulating bed systems are conventionally used in hydrocarbon conversion, e.g., hydrocarbon cracking, operations with the fluidized catalyst bed reactor-regenerator systems being preferred.

The catalyst system used in accordance with certain embodiments of the invention is preferably comprised of a mixture of two types of particles.

Although the presently useful solid particles and discrete entities may be used as a physical admixture of separate particles, in one embodiment the discrete entities are combined as part of the solid particles. That is, the discrete entities, e.g., comprising calcined microspheres containing magnesium-aluminum-containing spinel and at least one added component as described herein, are combined with the solid particles, e.g., during the manufacture of the solid particles, to form combined particles which function as both the presently useful solid particles and discrete entities. The discrete entities in such combined particles preferably exist as a separate and distinct phase. One preferred method for providing the combined particles is to calcine the discrete entities prior to incorporating the discrete entities into the combined particles.

The form, i.e., particle size, of the present catalyst particles, e.g., both solid particles and discrete entities as well as the combined particles, is not critical to the present invention and may vary depending, for example, on the type of reaction-regeneration system employed. Such catalyst particles may be formed into any desired shape such as pills, cakes, extrudates, powders, granules, spheres and the like, using conventional methods. With regard to fluidized catalyst bed systems, it is preferred that the major amount by weight of the present catalyst particles have a diameter in the range of about 10 microns to about 250 microns, more preferably about 20 microns to about 150 microns.

The solid particles are capable of promoting the desired hydrocarbon conversion. The solid particles are further characterized as having a composition (i.e., chemical make-up) which is different from the discrete entities. In one preferred embodiment, the solid particles (or the solid particles portion of the combined particles described above) are substantially free of magnesium-aluminum-containing spinel.

In another aspect of the present invention, the discrete entities, whether present as a separate and distinct particle and/or combined with the solid particles in a single, preferably substantially uniform, mass of combined particles further comprise a minor amount of at least one additional metal, e.g., platinum group metal, component capable of promoting the oxidation of sulfur dioxide to sulfur trioxide at the conditions in the combustion, e.g., catalyst regeneration, zone. For example, an effective amount of at least one sulfur oxide oxidation catalytic component, e.g., metal or compounds of metals selected from Group IB, IIB, IVB, VIA, VIB, VIIA and VIII of the Periodic Table, the rare earth metals, vanadium, tin, antimony and mixtures thereof, disposed on a support, e.g., one or more inorganic oxides, may be included with the present solid particles and discrete entities and/or may be included on the solid particles and/or discrete entities. As noted previously, the sulfur oxide oxidation component may be associated with, e.g., deposited on, the spinel component of the present discrete entities.

The composition of the solid particles useful in the present invention is not critical, provided that such particles are capable of promoting the desired hydrocarbon conversion. Particles having widely varying compositions are conventionally used as catalyst in such hydrocarbon conversion processes, the particular composition chosen being dependent, for example, on the type of hydrocarbon chemical conversion desired. Thus, the solid particles suitable for use in the present invention include at least one of the natural or synthetic materials which are capable of promoting the desired hydrocarbon chemical conversion. For example, when the desired hydrocarbon conversion involves one or more of hydrocarbon cracking, disproportionation, isomerization, polymerization, alkylation and dealkylation, such suitable materials include acid-treated natural clays such as montmorillonite, kaolin and bentonite clays; natural or synthetic amorphous materials, such as amorphous silica-alumina, silica-magnesia and silica-zirconia composites; crystalline aluminosilicate often referred to as zeolites or molecular sieves and the like. In certain instances, e.g., hydrocarbon cracking and disproportionation, the solid particles preferably include such crystalline aluminosilicate to increase catalytic activity. Methods for preparing such solid particles and the combined solid particles-discrete entities particles are conventional and well known in the art. Certain of these procedures are thoroughly described in U.S. Pat. Nos. 3,140,253 and Re. 27,639.

Compositions of the solid particles which are particularly useful in the present invention are those in which the crystalline aluminosilicate is incorporated in an amount effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of silica-alumina, magnesia, zirconia, mixtures of these and the like. The crystalline aluminosilicate is preferably incorporated into the matrix material in amounts within the range of about 1% to about 75%, more preferably about 2% to about 50%, by weight of the total solid particles. The preparation of crystalline aluminosilicate-amorphous matrix catalytic materials is described in the above-mentioned patents. Catalytically active crystalline aluminosilicates which are formed during and/or as part of the methods of manufacturing the solid particles, discrete entities and/or combined particles are within the scope of the present invention. The solid particles are preferably substantially free of added rare earth metal, e.g., cerium, component dispersed on the amorphous matrix material of the catalyst, although such rare earth metal components may be associated with the crystalline aluminosilicate components of the solid particles.

As indicated above, the discrete entities utilized in the present invention comprise an effective amount, preferably a major amount, of at least one magnesium-aluminum-containing spinel.

The spinel structure is based on a cubic close-packed array of oxide ions. Typically, the crystallo-graphic unit cell of the spinel structure contains 32 oxygen atoms. With regard to magnesium aluminate spinel, these often are eight Mg atoms and sixteen Al atoms to place in a unit cell ($8MgAl_2O_4$). Other alkaline earth metal ions, such as calcium, strontium, barium and mixtures thereof, may replace all of a part of the magnesium ions. Similarly, other trivalent metal ions, such as iron, chromium, gallium, boron, cobalt and mixtures thereof, may replace all of a part of the aluminum ions.

The presently useful magnesium-aluminum-containing spinels may have a magnesium to aluminum atomic ratio which is not consistent with the classical stoichiometric formula for such spinel. In one embodiment, the atomic ratio of the magnesium to aluminum in the spinels useful in the present invention is at least about 0.17 and preferably at least about 0.25. It is preferred that the atomic ratio of magnesium to aluminum in the spinel be in the range of about 0.17 to about 2.5, more preferably about 0.25 to about 2.0.

Further, details on the spinel structure are described in the following references, which are hereby incorporated herein by reference: "Modern Aspects of Inorganic Chemistry" by H. I. Emaleus and A. G. Sharpe (1973), pp. 57–58 and 512–513; "Structural Inorganic Chemistry", 3rd edition, (1962) by A. F. Wells, pp. 130, 487–490, 503 and 526; and "Advanced Inorganic Chemistry", 3rd edition, by F. A. Cotton and G. Wilkinson (1972), pp. 54–55.

The magnesium-aluminum-containing spinels useful in the present invention may be derived from conventional and well known sources. For example, these spinels may be naturally occurring or may be synthesized using techniques well known in the art. Thus, a detailed description of such techniques is not included herein. However, a brief description of the preparation of the most preferred spinel, i.e., magnesium aluminate spinel, is set forth below.

The magnesium aluminate spinel suitable for use in the present invention can be prepared, for example, according to the method disclosed in U.S. Pat. No. 2,992,191. The spinel can be formed by reacting, in an aqueous medium, a water-soluble magnesium inorganic salt and a water-soluble aluminum salt in which the aluminum is present in the anion. Suitable salts are exemplified by the strongly acidic magnesium salts such as the chloride, nitrate or sulfate and the water soluble alkali metal aluminates. The magnesium and aluminate salts are dissolved in an aqueous medium and a spinel precursor is precipitated through neutralization of the aluminate by the acidic magnesium salt. Excesses of acid salt or aluminate are preferably not employed, thus avoiding the precipitation of excess magnesia or alumina. Preferably, the precipitate is washed free of extraneous ions before being further processed.

The precipitate can be dried and calcined to yield the magnesium aluminate spinel. Drying and calcination may take place simultaneously. However, it is preferred that the drying takes place at a temperature below which water of hydration is removed from the spinel precursor. Thus, this drying may occur at temperatures below about 500° F., preferably from about 200° F. to about 450° F. Suitable calcination temperatures are exemplified by temperatures ranging from about 800° F. to about 2000° F. or more. Calcination of the spinel precursor may take place in a period of time of at least about one half hour and preferably in a period of time ranging from about 1 hour to about 10 hours.

Another process for producing the presently useful magnesium aluminate spinel is set forth in U.S. Pat. No. 3,791,992. This process includes mixing a solution of a soluble acid salt of divalent magnesium with a solution of an alkali metal aluminate; separating and washing the resulting precipitate; exchanging the washed precipitate with a solution of an ammonium compound to decrease the alkali metal content; followed by washing, drying, forming and calcination steps. The disclosure of U.S. Pat. No. 3,791,992 is hereby incorporated herein by reference.

Other methods of preparing the presently useful magnesium-aluminum-containing spinel compositions are disclosed in U.S. patent application Ser. Nos. 445,304, now U.S. Pat. No. 4,472,532, 445,305, now abandoned, 445,306, now U.S. Pat. No. 4,476,245, and 445,130, now U.S. Pat. No. 4,471,070, which are commonly assigned with this application.

In general, as indicated previously, the magnesium-aluminum-containing spinels useful in the present invention may be prepared by methods which are conventional and well known in the art.

The magnesium-aluminum-containing spinel-based composition may be formed into particles of any desired shape such as pills, cake, extrudates, powders, granules, spheres, and the like using conventional methods. The size selected for the particles can be dependent upon the intended environment in which the final discrete entities are to be used—as, for example, whether in a fixed catalyst bed circulating catalyst bed reaction system or whether as a separate particle or as part of a mass of combined particles.

Substantially non-interferring proportions of other well known refractory material, e.g., inorganic oxides such as silica, zirconia, thoria and the like may be included in the present discrete entities. Free magnesia and/or alumina (i.e., apart from the spinel) also may be included in the discrete entities, e.g., using conventional techniques. For example, the discrete entities may include about 0.1% to about 25% by weight of free magnesia (calculated as MgO). By substantially "non-interferring" is meant amounts of other material which do not have a substantial deleterious effect on the present spinel composition, the present catalyst system or hydrocarbon conversion process. The inclusion of materials such as silica, zirconia, thoria and the like into the present discrete entities may act to improve one or more of the functions of the discrete entities.

The added component or components may be included in the presently useful discrete entities in any suitable conventional manner. This component is preferably introduced into the discrete entities after the spinel or spinel precursor is formed. This added component is distinguished from the alkali metal component that may be present as in inherent part of the materials used to produce the spinel or spinel precursor during the formation of the spinel precursor. This "inherent" alkali metal component is ordinarily washed from the precursor to insure proper spinel formation and/or function. The present added component or components are included in the magnesium-aluminum-containing spinel compositions from a source or sources other than the materials used to produce the spinel compositions. When the added component is selected from alkali metal components and mixtures thereof, it is preferably present in an amount in the range of about 0.1% to about 15%, more preferably about 0.25% to about 10%, by weight (calculated as elemental metal) of the discrete entities. When the added component is selected from the group consisting of calcium components, barium components, strontium components, beryllium components and mixtures thereof, it is preferably present in an amount in the range of about 0.1% to about 25%, more preferably about 0.5% to about 20%, by weight (calculated as elemental metal) of the discrete entities.

In a preferred embodiment, the added component is associated with, e.g., deposited on, the discrete entities after the spinel is formed. In a further preferred embodiment, the added component is deposited on the discrete entities using one or more impregnation techniques, e.g., conventional techniques.

A suitable method of preparation is to impregnate a support with solutions of compounds of the desired metals. Suitable compounds useful for impregnation include the acetates, acetylacetonates, oxides, carbides, carbonates, hydroxides, formates, oxalates, nitrates, phosphates, sulfates, sulfides, tartrates, fluorides, chlorides, bromides, or iodides. After impregnation the preparation is dried in an oven to remove solvent and the dried solid is prepared for use by calcining, preferably in air at a temperature selected within the range of about 300° C. to 1200° C. Particular calcination temperatures will vary depending upon the particular metal compound or compounds employed.

Cerium or other suitable rare earth or rare earth mixture may be associated with the spinel using any suitable technique or combination of techniques; for example, impregnation, coprecipitation, ion-exchange and the like, well known in the art, with impregnation being preferred. Impregnation may be carried out by contacting the spinel with a solution, preferably aqueous, of rare earth; for example, a solution containing cerium ions (preferably $Ce^{+3}$, $Ce^{+4}$ or mixtures thereof) or a mixture of rare earth cations containing a substantial amount (for example, at least 40%) of cerium ions. Water-soluble sources of rare earth include the nitrate and chloride. Solutions having a concentration of rare earth in the range of 3 to 30% by weight are preferred.

Preferably, sufficient rare earth salt is added to incorporate about 0.05 to 25% (weight), more preferably about 2 to 15% rare earth, and still more preferably about 3 to 12% rare earth, by weight, calculated as elemental metal, on the particles.

It may not be necessary to wash the spinel after certain soluble rare earth salts (such as nitrate or acetate) are added. After impregnation with rare earth salt, the spinel can be dried and calcined to decompose the salt, forming an oxide in the case of nitrate or acetate. Alternatively, the spinel, e.g., in the form of discrete particles, can be charged to a hydrocarbon conversion, e.g., cracking unit, with the rare earth in salt form. In this case a rare earth salt with a thermally decomposable anion can decompose to the oxide in the reactor and be available to associate with SOx in the regenerator.

Especially good results were achieved using spinel containing discrete entities such that the concentration of rare earth metal, e.g., cerium, calculated as the metal, is in the range of about 1% to about 25%, more preferably about 2% to about 15%, by weight of the total discrete entities.

The present discrete entities preferably further comprise a minor amount of at least one crystalline aluminosilicate capable of promoting the desired hydrocarbon conversion. Typical aluminosilicates have been described above. Preferably, such aluminosilicates comprise about 1% to about 30%, more preferably about 1% to about 10%, by weight of the discrete entities. The presence of such aluminosilicate in the present discrete entities acts to increase the overall catalytic activity of the solid particles-discrete entities mixture for promoting the desired hydrocarbon conversion.

As indicated above, in one preferred embodiment the presently useful particulate material, e.g., the discrete entities utilized in the present invention, also contain at least one additional metal, e.g., platinum group metal, component. These additional metal components are defined as being capable of promoting the oxidation of sulfur dioxide to sulfur trioxide at combustion conditions, e.g., the conditions present in the catalyst regenerator. Increased carbon monoxide oxidation may also be obtained by including at least one of the additional metal components. Such metal components may be incorporated into the presently useful particulate material, e.g., the discrete entities, in any suitable manner. Many techniques for including the additional metal in the particulate material are conventional and well known in the art. The additional metal, e.g., platinum group metal, such as platinum, may exist within the particulate material, e.g., discrete entities, at least in part as a compound such as an oxide, sulfide, halide and the like, or in the elemental state. Generally, the amount of the platinum group metal component present in the final discrete entities is small compared to the quantity of the spinel. The platinum group metal component preferably comprises from about 0.05 parts-per-million (ppm) to about 1%, more preferably about 0.5 ppm. to about 500 ppm., by weight of the discrete entities, calculated an elemental basis. Excellent results are obtained when the discrete entities contain about 50 ppm. to about 200 ppm., and in particular about 50 ppm. to about 90 ppm., by weight of at least one platinum group metal component. The other additional metals may be included in the particulate material in an amount effective to promote the oxidation of at least a portion, preferably a major portion, of the sulfur dioxide present to sulfur trioxide at the conditions of combustion, e.g., conditions present in the catalyst regeneration zone of a hydrocarbon catalytic cracking unit. Preferably, the present discrete entities comprise a minor amount by weight of at least one additional metal component (calculated as elemental metal). Of course, the amount of additional metal used will depend, for example, on the degree of sulfur dioxide oxidation desired and the effectiveness of the additional metal component to promote such oxidation.

Alternately to inclusion in the discrete entities, one or more additional metal component may be present in all or a portion of the above-noted solid particles and/or may be included in a type of particle other than either the present solid particles or discrete entities. for example, separate particles comprising at least one additional metal component and porous inorganic oxide support, e.g., platinum on alumina, may be included along with the solid particle and discrete entities to promote sulfur dioxide oxidation.

The additional metal, e.g., platinum group metal, component may be associated with the spinel based composition in any suitable manner, such as by the impregnation of the spinel at any stage in its preparation and either after or before calcination of the spinel based composition. As indicated previously, various procedures for incorporating the additional metal component or components into the particulate material are conventional and well known in the art. Preferably, the additional metal component is substantially uniformly disposed on the spinel of the present discrete entities. One preferred method for adding the plantinum group metal to the spinel involves the utilization of a water soluble compound of the platinum group metal to impregnate the spinel. For example, platinum may be added to the spinel by comingling the spinel with an aqueous solution of chloroplatinic acid. Other water-soluble compounds of platinum may be employed as impregnation solutions, including, for example, ammonium chlorplatinate and platinum chloride.

Both inorganic and organic compounds of the platinum group metals are useful for incorporating the platinum group metal component into the present discrete entities. Platinum group metal compounds, such as chlorplatinic acid and palladium chloride are preferred.

It may be desirable to be able to separate the discrete entities from the solid particles, for example, when it is desired to use the solid particles alone for hydrocarbon conversion of where it is desired to reover the discrete entities for other uses or for example, for platinum group metal recovery. This can be conveniently accomplished by preparing the second solid particles in a manner such that they have a different size than the first solid particles. The separation of the first and second solid particles can then be easily effected by screening or other means of size segregation.

As noted above, the presently useful solid particles and discrete entities can be employed in a mass of combined particles which function as both the solid particles, e.g., promotes hydrocarbon conversion, and the discrete entities. Such combined articles may be produced in any suitable manner, certain of which methods are conventional and known in the art.

The spinel-containing compositions of the present invention find particular applicability in reducing sulfur oxide emissions from combustion zones wherein the oxygen present in the combustion zone is insufficient to provide for complete combustion of the combustible materials, e.g., of the sulfur-containing carbonaceous deposit material referred to previously. For example, in the regeneration zone of a hydrocarbon catalytic cracking unit, oxygen is present to convert carbonaceous material, e.g., deposited on the cracking catalyst, to carbon dioxide, water, sulfur oxides and the like oxidized products. In certain instances, the amount of oxygen present in such catalyst regeneration zones is insufficient to completely combust this carbonaceous material to the fully oxidized products. In this instance, the present spinel-containing compositions provide substantial activity in reducing the sulfur content of the flue gases from the regeneration zone. In this application, it is preferred that the additional metal component referred to previously not be present in association with the spinel-containing composition. Thus, these compositions, in the substantial absence of additional metal component, e.g., cerium, provide substantial benefits, e.g., removal of sulfur, from combustion zones in which the oxygen present is insufficient to fully combust the combustible material.

Although this invention is useful in many hydrocarbon chemical conversions, the present catalyst, i.e., mixture comprising solid particles and discrete entities, and process find particular applicability in systems for the catalytic cracking of hydrocarbons and the regeneration of catalyst so employed. Such catalytic hydrocarbons cracking often involves converting, i.e., cracking, heavier or higher boiling hydrocarbons to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400° F. to about 1000° F. Other substantially hydrocarbon feedstocks, e.g., other high boiling or heavy fractions of petroleum, shale oil, tar sand oil, coal and the like may be cracked using the catalyst and method of the present invention. Such substantially hydrocarbon feedstock often contains minor amounts of contaminants, e.g., sulfur, nitrogen and the like. In one aspect, the present invention involves converting a hydrocarbon feedstock containing sulfur and/or sulfur chemically combined with the molecules of hydrocarbon feedstock. The present invention is particularly useful when the amount of sulfur in such hydrocarbon feedstock is in the range of about 0.01% to about 5%, preferably about 0.1% to about 3% by weight of the total feedstock.

Hydrocarbon cracking conditions are well known and often include temperatures in the range of about 850° F. to about 1100° F., preferably about 900° F. to about 1050° F. Other reaction conditions usually include pressures of up to about 100 psia.; catalyst to oil ratios of about 1 to 2 to about 25 to 1, preferably about 3 to 1 to about 15 to 1; and weight hourly space velocities (WHSV) of from about 3 to about 60. These hydrocarbon cracking conditions may be varied depending, for example, on the feedstock and solid particles or combined particles being used and the product or products wanted.

In addition, the catalytic hydrocarbon cracking system includes a regeneration zone for restoring the catalytic activity of the solid particles or combined particles of catalyst previously used to promote hydrocarbon cracking. Carbonaceous, in particular sulfur-containing, carbonaceous, deposit-containing catalyst particles from the reaction zone are contacted with free oxygen-containing gas in the regeneration zone at conditions to restore or maintain the activity of the catalyst by removing, i.e., combusting, at least a portion of the carbonaceous material from the catalyst particles. When the carbonaceous deposit material contains sulfur, at least one sulfur-containing combustion product is produced in the regeneration zone and may leave the zone with the regenerator flue gas. The conditions at which such free oxygen-containing gas contacting takes place may vary, for example, over conventional ranges. The temperature in the catalyst regeneration zone of a hydrocarbon cracking system is often in the range of about 900° F. to about 1500° F., preferably about 1100° F. to about 1350° F. and more preferably about 1100° F. to about 1300° F. Other conditions within such regeneration zone may include, for example, pressures up to about 100 psia., average catalyst contact times within the range of about 3 minutes to about 120 minutes, preferably from about 3 minutes to about 75 minutes. Sufficient oxygen is preferably present in the regeneration zone to completely combust the carbon and hydrogen of the carbonaceous deposit material, for example, to carbon dioxide and water. The amount of carbonaceous material deposited on the catalyst in the reaction zone is preferably in the range of about 0.005% to about 15%, more preferably about 0.1% to about 5% by weight of the catalyst. The amount of carbonaceous material deposited on the catalyst in the reaction zone is preferably in the range of about 0.005% to about 15%, more preferably about 0.1% to about 10%, by weight of the catalyst. The amount of sulfur, if any, contained in the carbonaceous deposit material depends, for example, on the amount of sulfur in the hydrocarbon feedstock. This deposit material may contain about 0.01% to about 10% or more by weight of sulfur. At least a portion of the regenerated catalyst is often returned to the hydrocarbon cracking reaction zone.

The solid particles useful in the catalytic hydrocarbon cracking embodiment of the present invention may be any conventional catalyst capable of promoting hydrocarbon cracking at the conditions present in the reaction zone, i.e., hydrocarabon cracking conditions. Similarly, the catalytic activity of such solid particles is restored at the conditions present in the regeneration zone. Typical among these conventional catalysts are those which comprise amorphous silica-alumina and at least one crystalline aluminosilicate having pore diameters of about 9 A to about 15 A and mixtures thereof. When the solid particles and/or discrete entities to be used in the hydrocarbon cracking embodiment of the present invention contain crystalline aluminosilicate, the crystalline aluminosilicate may include minor amounts of conventional metal promoters such as the rare earth metals, in particular, cerium.

As indicate previously, one embodiment of the present invention involves contacting solid, sulfur-containing material in a combustion zone at combustion conditions to produce combustion products including at least one sulfur oxide at least a portion of which is sulfur trioxide. Reduced emissions of sulfur oxide from the combustion zone are achieved by carrying out this contacting in the presence of discrete entities as defined herein.

Typical solid material combustion zones include, for example, fluid bed coal burning steam boilers and fluid sand bed waste combustors. The present discrete entities have sufficient strength to withstand the conditions in such combustion zones. In the coal fired boiler application, the discrete entities are added, either separately or with the sulfur-containing coal, to the combustion zone, e.g., boiler, where combustion takes place and at least some sulfur trioxide is formed. The discrete entities leave the combustion zone with the coal ash and can be separated from the ash, e.g., by screening, density separation, or other well known solids separation techniques. The flue gases leaving the combustion zone have reduced amounts of sulfur oxide, e.g., relative to combustion in the absence of the discrete entities. The discrete entities from the combustion zone can then be subjected to a reducing environment, e.g., contacted with $H_2$, at conditions such that at least a portion of the sulfur associated with the discrete entities disassociates with the discrete entities, e.g., in the form of $H_2S$, and is removed for further processing, e.g., sulfur recovery. The discrete entities, after sulfur removal may be recycled to the combustion zone, e.g., boiler.

Conditions within the boiler may be those typically used in fluid-bed coal burning boilers. The amount of discrete entities used is sufficient to reduce sulfur oxide emissions in the boiler flue gas, preferably, by at least about 50% and more preferably by at least about 90%. Conditions within the reducing zone are such that at least a portion, preferably at least about 50% and more preferably at least about 80% of the sulfur associated with the discrete entities is removed. For example, reducing conditions may include temperatures in the range of about 900° F. to about 1800° F.; pressures in the range of about 14 to about 100 psia; and $H_2$ to associates sulfur mole ratio in the range of about 1 to about 10.

In the fluid sand bed waste combustion application, the fluid sand, e.g., which acts as a heat sink, may be combined with the discrete entities and circulated from the combustion zone to the reduction zone. Reduced emissions of sulfur oxide from the combustion zone are thus achieved.

Conditions in the combustion zone may be as typically employed in fluid sand bed waste combustors, The amount of discrete entities employed is sufficient to reduce sulfur oxide emissions to the combustor flue gases, preferably by at least about 50% and more preferably by at least about 80%. Conditions within the reducing zone are similar to those set forth above for the coal fired boiler application.

The following examples are provided to better illustrate the invention, without limitation, by presenting several specific embodiments of the process of the invention.

EXAMPLE I

The base spinel precursor was prepared using the following procedure.

Magnesium nitrate hexahydrate (166.7 g., 0.65 mole) was dissolved in 325 ml. water. The acidity was adjusted by slowly adding 26 ml. (0.41 mole) of concentrated nitric acid.

Sodium aluminate (Nalco) (142.8 g., 0.65 mole $Al_2O_3$ and 0.71 mole $Na_2O$) was separately dissolved in 425 ml. water.

The sodium aluminate solution was added, with stirring, to the magnesium nitrate solution over a period of 1 hour. The resulting aqueous slurry pH was monitored and was brought to a pH of 9.5 by dropwise addition of 20% NaOH solution. After stirring for an additional hour, the slurry was permitted to age quiescently for 16 hours at ambient temperature.

The slurry was filtered, washed with water to remove sodium ion, and the washed filter cake dried at 260° F. for 16 hours in a forced air forced air oven. The dried product was ground to pass through 60-mesh screen.

EXAMPLE II

A portion of the dried product produced in accordance with Example I was calcined by heating gradually to 1350° F. over 4 hours and being held at that temperature in a flowing air stream for an additional 3 hours. This calcined spinel base was impregnated with aqueous cerium nitrate using a conventional incipient wetness technique. The impregnated material was calcined at 1350° F. for 3 hours in a flowing air stream, following a gradual heat-up to that temperature. The sodium content of this calcined product was about 0.09% by weight. The calcined product also contained 10% by weight of cerium, calculated as elemental cerium.

EXAMPLE III

Another portion of the dried product produced in accordance with Example I was impregnated with an aqueous solution of sodium nitrate using a conventional incipient wetness technique. This impregnated material was dried for 16 hours at 260° F., then calcined at 1350° F. for 3 hours in a flowing air stream, following a gradual heat up to that temperature. This calcined material contained 0.91% by weight of sodium.

EXAMPLE IV

Another portion of the dried product produced in accordance with Example I was impregnated with an aqueous solution of calcium nitrate hydrate using a conventional incipient wetness technique. This impregnated material was dried for 16 hours at 260° F., then calcined at 1350° F. for 3 hours in a flowing air stream, following a gradual heat up to that temperature. This calcined material contained 5.84% by weight of calcium.

EXAMPLE V

Another portion of the dried product produced in accordance with Example I was impregnated with an aqueous solution of barium nitrate using a conventional incipient wetness technique. This impregnated material was dried for 16 hours at 260° F., then calcined at 1350° F. for 3 hours in a flowing air stream, following a gradual heat up to that temperature. This calcined material contained 1.87% by weight of barium.

EXAMPLE VI TO VIII

Each of the calcined products from Examples III, IV and V was impregnated with an aqueous solution of cerium nitrate using a conventional incipient wetness technique. The impregnated materials were then calcined at 1350° F. for 3 hours in a flowing air stream, following a gradual heat-up to that temperature. Each of the resulting materials contained 10 wt. % cerium, calculated as elemental cerium.

EXAMPLE IX

Spinel-containing compositions of the preceding Examples II, VI, VII and VIII, after dilution to 1.0–1.75 wt. % with equilibrium, commercially available fluid catalytic cracking catalyst (FCC catalyst), were tested for sulfur pick-up capabilities as follows. Each of these materials was fluidized in a gas stream, comprising (by volume) 5.9% $O_2$, 1.5% $SO_2$ and 92.6% $N_2$, after heating at 1350° F. in a stream of nitrogen gas. After a 15-minute treatment with the $SO_2$-containing gas, remaining $SO_2$ was flushed out with nitrogen. After cooling, analyses for sulfur were conducted on the solids and on the gas stream to determine the efficiency of SOx pickup by formation of metal sulfates. These materials were found to have a substantial capability to pick-up sulfur as shown in Table I.

EXAMPLE X

The sulfur-containing, spinel-containing compositions from Example IX were heated to 1350° F. in flowing nitrogen gas and then for 5 minutes in a stream of hydrogen. Each spinel composition was flushed with nitrogen, and, after cooling, as analyzed for sulfur content, to determine the efficiency of sulfur removal by reduction of metal sulfates. Each of these materials was found to have a substantial capability to release sulfur under the conditions of the above-noted treatment.

EXAMPLE XI

Portions of the mixtures of FCC catalyst and spinel compositions prepared in Example IX were steamed (prior to being tested in accordance with the procedures of Examples IX and X) as follows: The mixture was charged into a quartz reactor, where it was heated under nitrogen pressure to 1400° F. at which time 100% steam was introduced. After 6 hours, the steam was stopped and nitrogen introduced. The mixture was kept at temperature for 15–20 minutes, then allowed to cool. The mixture was then tested for sulfur pick-up in accordance with Example IX (results shown in Table I) and for sulfur release in accordance with Example X. Each of these steamed materials was found to have a substantial capability to pickup and release sulfur under the conditions of the above-noted treatments.

TABLE I[1]

| Composition[2] | SOx Pickup, % | Activity[3] |
|---|---|---|
| From Example II | 76 | 35 |
| Steamed | 22 | 9 |
| From Example VI | 69 | 55 |
| Steamed | 26 | 11 |
| From Example VII | —[4] | —[4] |
| Steamed | 59 | 31 |
| From Example VIII | 66 | 52 |
| Steamed | 39 | 20 |

[1]The FCC catalyst employed had a minor SOx pickup activity which was taken into account in the SOx pickup data shown below. Thus, these data reflect the actual SOx pickup of the mixture of FCC catalyst plus composition of Example.
[2]As blend of 1.25 wt. % of the composition prepared in the Example in FCC catalyst (except for Example I).
[3]Activity = $\dfrac{\text{SOx pickup from composition of Example} - \text{SOx pickup from FCC Catalyst}}{\text{Wt. \% concentration of composition of Example in mixtures of composition of Example plus FCC catalyst}}$
[4]Data not available.

While this invention has been described with respect to various specific examples and embodiments, it is to be understood that the invention is not limited thereto and that it can be variously practiced within the scope of the following claims:

The embodiments of this invention in which an exclusive property or privilege is claimed are defined as follows:

1. A composition of matter comprising, in intimate admixture, a major amount of solid particles capable of promoting hydrocarbon conversion at hydrocarbon conditions and a minor amount of discrete entities having a composition different from said solid particles and comprising at least one magnesium-aluminum-containing spinel, and a minor amount of at least one added component selected from the group consisting of alkali metal components, calcium components, barium components, strontium components, beryllium components and mixtures thereof, said discrete entities being present in an amount sufficient to reduce the amount of sulfur oxides in an effluent flue gas.

2. The composition of claim 1 wherein said entities further comprise at least one rate earth metal component.

3. The composition of claim 1 wherein said hydrocarbon conversion comprises hydrocarbon cracking in the substantial absence of added molecular hydrogen and a major amount, by weight of said solid particles having diameters in the range of about 10 microns to about 250 microns.

4. The composition of claim 2 wherein said hydrocarbon conversion comprises hydrocarbon cracking in the substantial absence of added molecular hydrogen and a major amount, by weight of said solid particles having diameters in the range of about 10 microns to about 250 microns.

5. The compositions of claim 3 wherein at least one of said solid particles and discrete entities further comprise a minor, catalytically effective amount of at least one additional metal component capable of promoting the conversion of sulfur dioxide to sulfur trioxide.

6. The composition of claim 4 wherein at least one of said solid particles and discrete entities further comprise a minor, catalytically effective amount of at least one additional metal component capable of promoting the conversion of sulfur dioxide to sulfur trioxide.

7. The composition of claim 5 wherein said additional metal component is at least one platinum group metal component.

8. The composition of claim 6 wherein said additional metal component is at least one platinum group metal component.

9. The composition of claim 1 wherein said added component is selected from the group consisting of alkali metal components and mixtures thereof and is present in an amount in the range of about 0.25 to about 10% by weight of the discrete entities (based on elemental metal).

10. The composition of claim 1 wherein said added component is selected from the group consisting of calcium component, barium component, strontium component, beryllium component and mixtures thereof and is present in an amount in the range of about 0.1% to about 25% by weight of the discrete entities (based on elemental metal).

11. The composition of claim 5 wherein said metal component is a cerium component and is present in an amount in the range of about 1% to about 25% by weight of the total discrete entities.

12. The composition of claim 6 wherein said rare earth metal component is a cerium component and is present in an amount in the range of about 1% to about 25% by weight of the total discrete entities.

* * * * *